W. E. CROOK.
HOSE COUPLING.
APPLICATION FILED JAN. 30, 1908.
921,368.
Patented May 11, 1909.
2 SHEETS—SHEET 1.
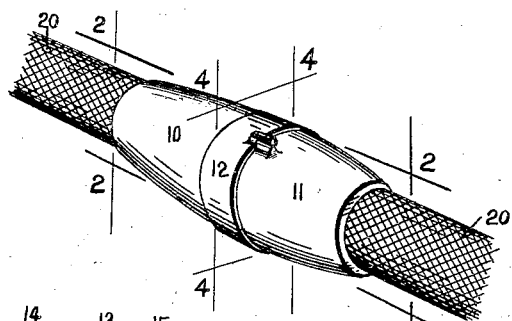
Fig. 1.
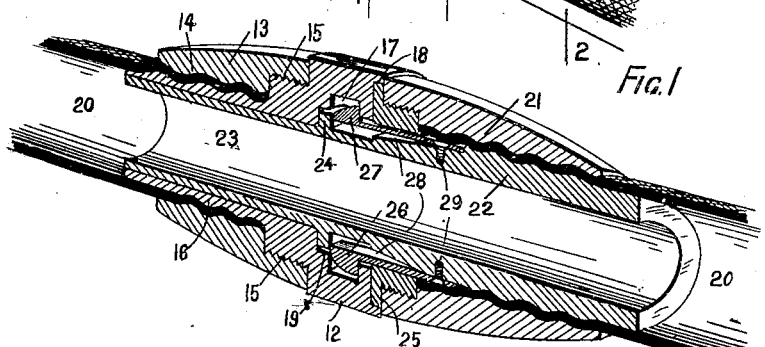
Fig. 2.
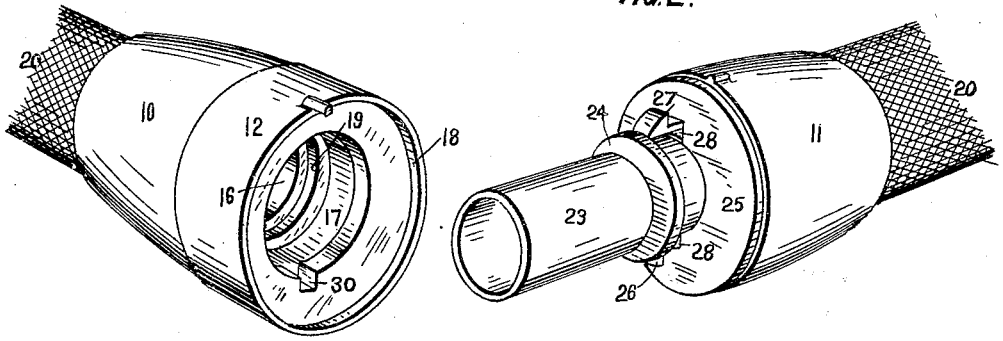
Fig. 3.
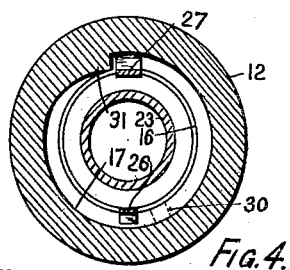
Fig. 4.
Fig. 5.
Witnesses
Inventor
William E. Crook.

W. E. CROOK.
HOSE COUPLING.
APPLICATION FILED JAN. 30, 1908.
921,368.
Patented May 11, 1909.
2 SHEETS—SHEET 2.
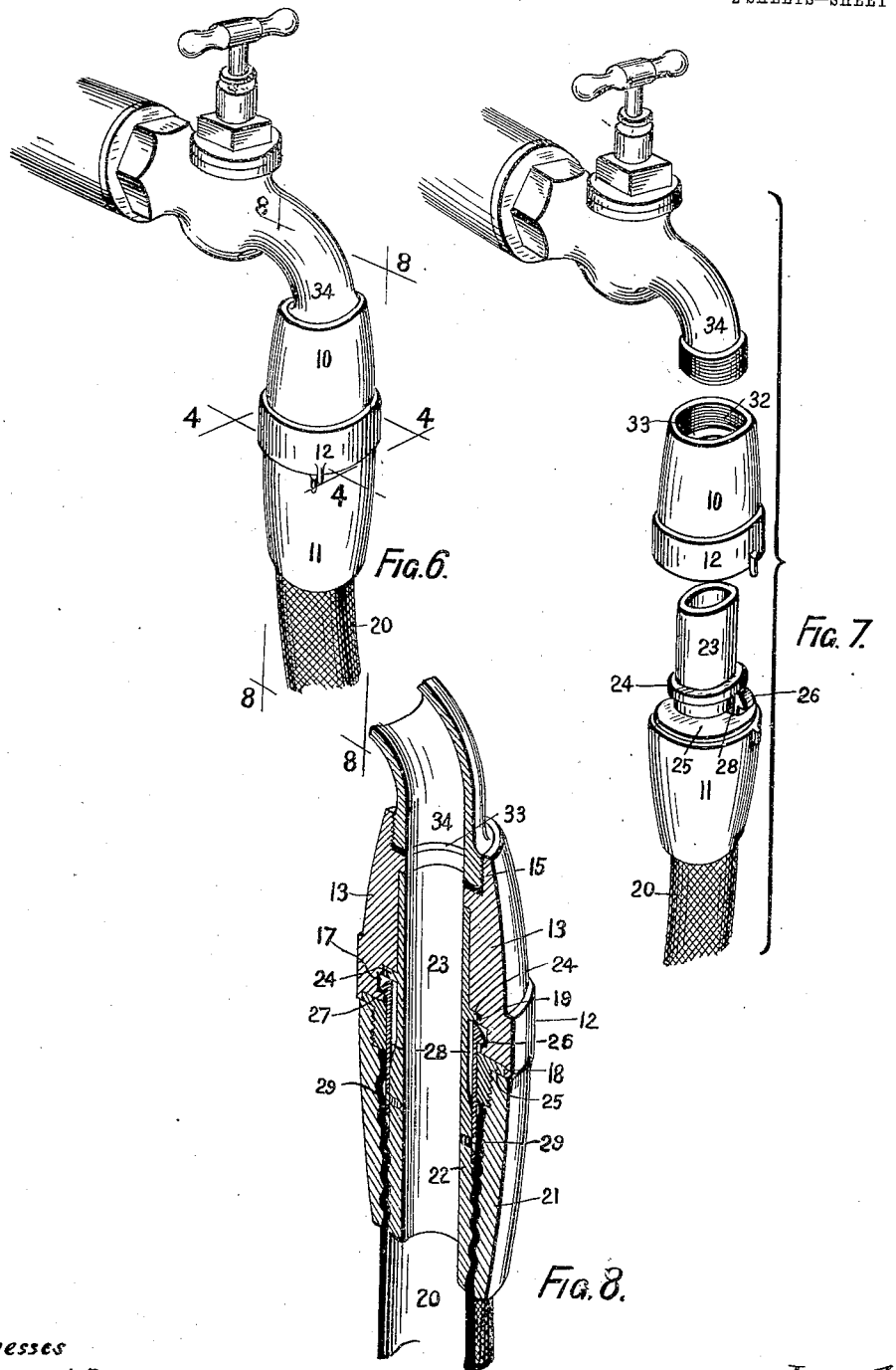
Witnesses
Inventor
William E. Crook.

UNITED STATES PATENT OFFICE.

WILLIAM E. CROOK, OF SURRY HILLS, NEAR SYDNEY, NEW SOUTH WALES, AUSTRALIA.

HOSE-COUPLING.

No. 921,368.     Specification of Letters Patent.     Patented May 11, 1909.

Application filed January 30, 1908. Serial No. 413,360.

*To all whom it may concern:*

Be it known that I, WILLIAM E. CROOK, a subject of the King of Great Britain and Ireland, residing at 22 Belmore street, Surry Hills, near Sydney, in the State of New South Wales, in the Commonwealth of Australia, musical-instrument maker, have invented certain new and useful Improvements in Hose-Couplings, of which the following is a specification.

This invention relates to a coupling for use in connection with canvas or rubber hose-piping, flexible steam or compressed air tubing and the like.

The object of the invention is to provide a coupling which will be simple in construction, cheap, easily manipulated and efficient.

In order that the invention may be clearly understood I will describe it by reference to the accompanying drawings in which:—

Figure 1 is a perspective view of coupling in the locked position. Fig. 2 is an enlarged sectional perspective on plane 2—2 Fig. 1. Fig. 3 is a perspective view of the two members which form the coupling. Fig. 4 is a section on plane 4—4 Fig. 1. Fig. 5 is a perspective view of the internal telescopic portion of the male member of the coupling. Fig. 6 is a perspective view of the coupling as applied to a water tap. Fig. 7 is a similar view showing the members uncoupled. Fig. 8 is a sectional perspective on plane 8—8 Fig. 6.

Referring to Figs. 1 to 5:—The coupling consists of two members 10 and 11. The member 10 is constructed in two pieces namely, a hollow casing 13 having its internal bore 14 slightly tapered and corrugated almost its entire length, and provided with a screw threaded portion 15. Within this hollow casing 13 is inserted a hollow plug 16 corrugated and screw threaded to correspond with the bore 14 of the casing 13 and having in its head 12 a rabbet 17 and recesses 18 and 19. The hose 20 or other flexible tubing is inserted into the bore 14. The plug 16 is then inserted and screwed into position thus firmly securing the hose to the member 10 of the coupling. The other member 11 is also constructed in two pieces namely, a hollow outer casing 21 which corresponds in construction with casing 13 and has a hollow plug 22. This plug 22 is similarly corrugated and threaded and has a tubular extension 23 which is ground to telescope tightly into the plug 16 and has a collar 24 fitting in recess 19. The flange head 25 of the plug 22 fits in recess 18 of the head 12 of plug 16.

In order to prevent the members from uncoupling the plug 22 is provided with a pair of spring catches 26 and 27 passing through orifices 28 in the head 25 and secured to said plug 22 by screws 29 so that when the members are coupled they fit into the rabbet 17. In order to uncouple the hose or other tubing, the member 11 is turned until the catch 26 is brought into juxta-position to its opening 30 which leads to the rabbet 17, while the other catch 27 mounts the ramp 31 thus enabling the one member to be withdrawn from the other. The spring catch 27 is somewhat wider than the catch 26 so that when the catch 27 is in the position shown in Fig. 4, the member 11 would have to make a full turn before the catch 26 would come into line with its opening 30.

Referring to Figs. 6 to 8:—The member 10 has its internal plug dispensed with, having a recess 32 containing a washer 33 and threaded to screw upon a water tap 34. The casing 13 of this member 10, has a similar rabbet 17 and recesses 18 and 19 as contained in the plug 16 described in Figs. 1 to 5. The other member 11 is exactly the same in construction as hereinbefore described.

What I claim and desire to secure by Letters Patent is:—

1. A hose coupling comprising a pair of internally corrugated members, a hollow externally corrugated plug screwed into each member, a tubular extension on one of said plugs fitting tightly into the second of said plugs, a rabbet in the second plug, a pair of spring catches of unequal width carried by the second plug adapted to be forced into said rabbet, a catch aperture for the narrower of said catches leading from said rabbet, and a ramp in the rabbet opposite said aperture, substantially as described.

2. A hose coupling comprising a pair of internally corrugated members, a hollow externally corrugated plug screwed into each member, a tubular extension on one of said plugs adapted to fit tightly into the second of said plugs, a rabbet in the second plug, a flange on the tubular extension engaging the second plug behind the rabbet, a circumferential flange on the second plug engaging the first plug, a pair of catches of unequal width carried by the first plug and adapted to be forced into said rabbet, an exit aperture for the narrower of said catches leading from the rabbet, and a ramp in said rabbet opposite said exit aperture, substantially as described.

Signed at Sydney this 21st day of December 1907.

WILLIAM E. CROOK.

Witnesses:
 WALTER SIGMONT,
 WILLIAM NEWTON.